United States Patent [19]

Futer

[11] 3,980,024

[45] Sept. 14, 1976

[54] AIR PROPELLED VEHICLE TRANSPORTATION SYSTEM

[76] Inventor: Rudolph E. Futer, 1501 Park Ave., Emeryville, Calif. 94608

[22] Filed: Nov. 18, 1974

[21] Appl. No.: 524,747

[52] U.S. Cl............................. 104/155; 104/138 R; 105/365; 243/2; 243/38; 302/24; 302/31
[51] Int. Cl.².......................................... B61B 13/10
[58] Field of Search............ 104/138 R, 147 R, 154, 104/155, 156, 157, 158, 159; 105/365; 243/1, 2, 3, 4, 6, 19, 32, 33, 38, 39; 302/24, 25, 29, 31

[56] References Cited
UNITED STATES PATENTS

| | | | |
|---|---|---|---|
| 1,307,365 | 6/1919 | Kinyon | 302/29 |
| 1,813,625 | 7/1931 | Knox | 104/155 |
| 3,248,071 | 4/1966 | Cook | 243/32 |
| 3,305,192 | 2/1967 | Todt et al. | 243/1 X |
| 3,316,657 | 5/1967 | Haywood | 302/29 |
| 3,352,512 | 11/1967 | James, Sr. | 104/155 X |
| 3,404,638 | 10/1968 | Edwards | 104/138 R X |
| 3,704,482 | 12/1972 | Brannon | 302/29 X |
| 3,731,647 | 5/1973 | Mimbidle, Jr. et al. | 243/6 X |
| 3,734,567 | 5/1973 | Fong | 302/31 X |
| 3,797,405 | 3/1974 | Carstens et al. | 104/155 |

*Primary Examiner*—Robert J. Spar
*Assistant Examiner*—Randolph A. Reese
*Attorney, Agent, or Firm*—James R. Cypher

[57] ABSTRACT

A low pressure transportation system for moving a vehicle between stations which are at atmospheric pressure without the use of valves in the vehicle conduit and without any substantial movement of system air in or out of the vehicle portals. The system comprising: an elongated vehicle conduit having first and second portals located at the extreme ends of the conduit, a plurality of coanda-effect directional slit orifices communicating with the conduit immediately adjacent the portals for supplying substantially all of the system air to the conduit at one end and removing substantially all of the system air at the other end. A pair of manifolds communicating with the separate areas of directional orifices; and blower means supplying air to one manifold and removing the air from the other manifold.

13 Claims, 14 Drawing Figures

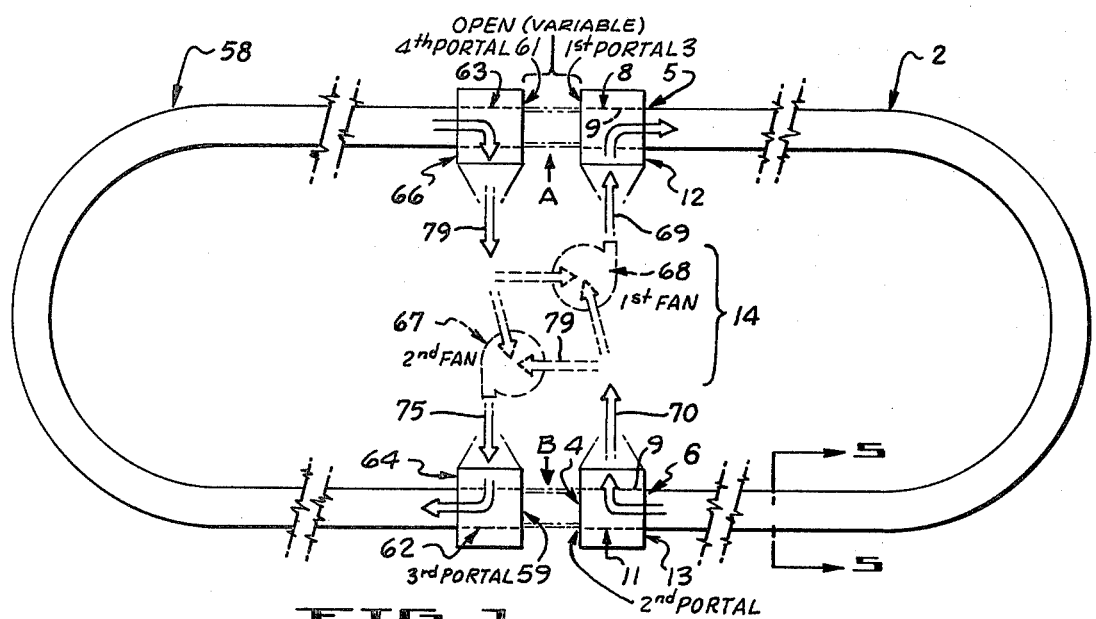
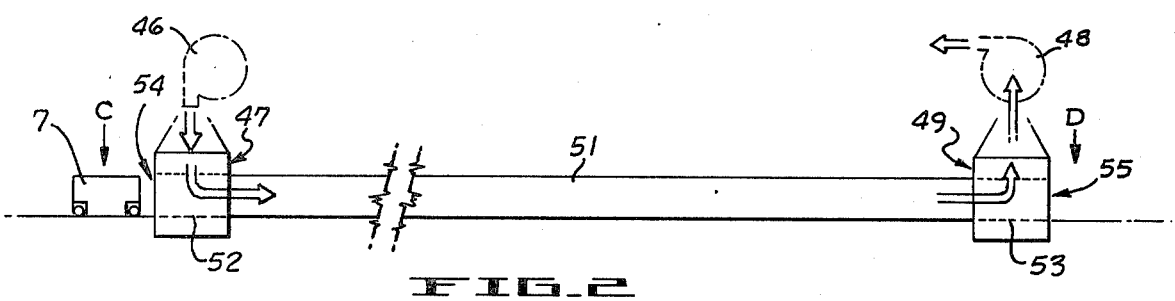
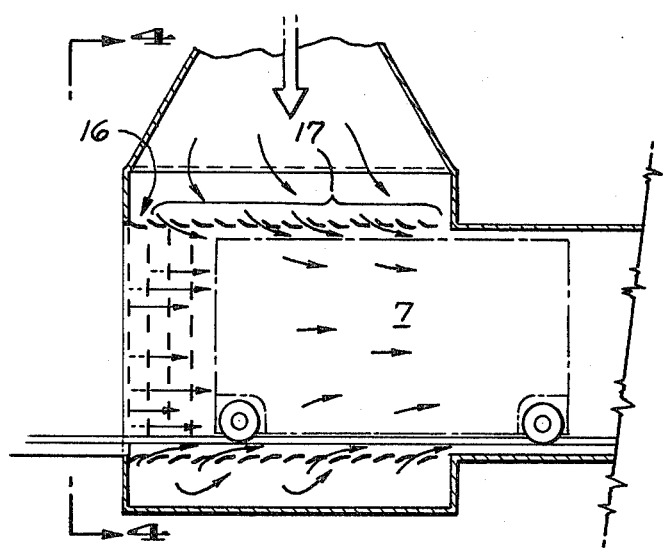
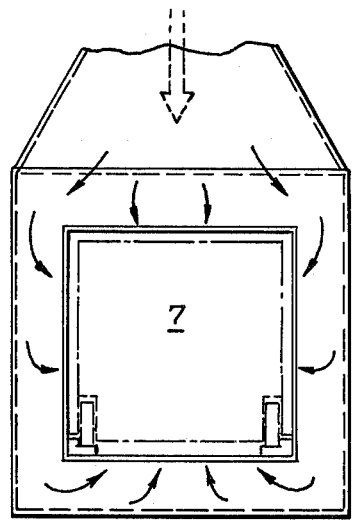
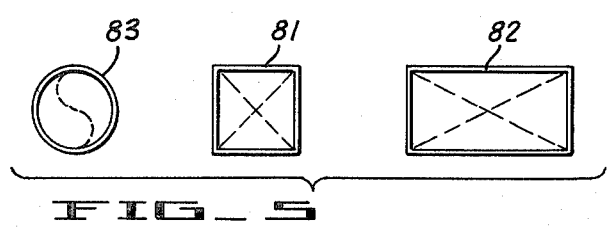

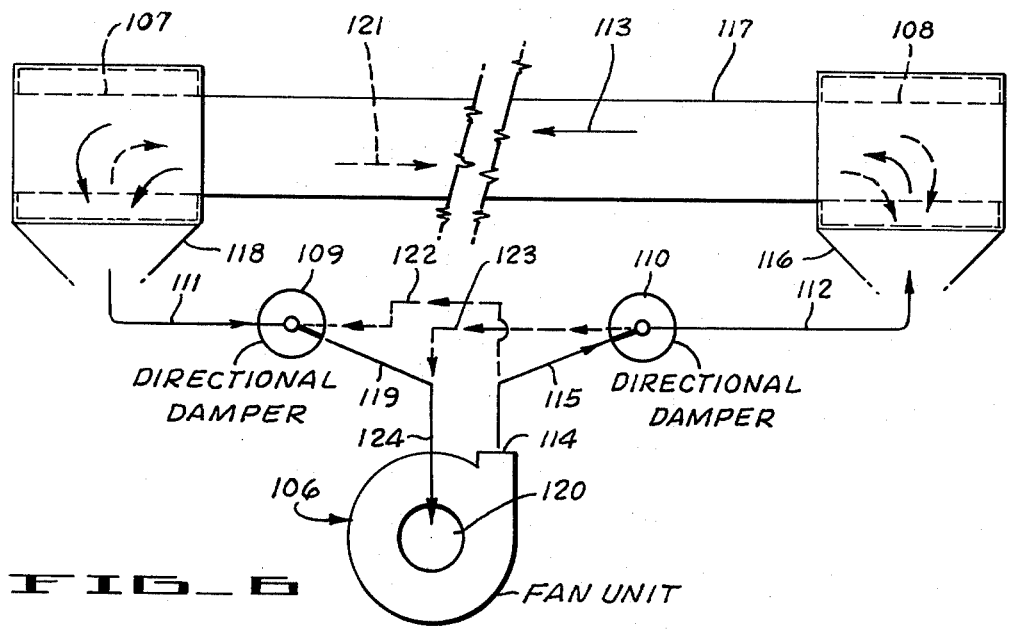
FIG_6
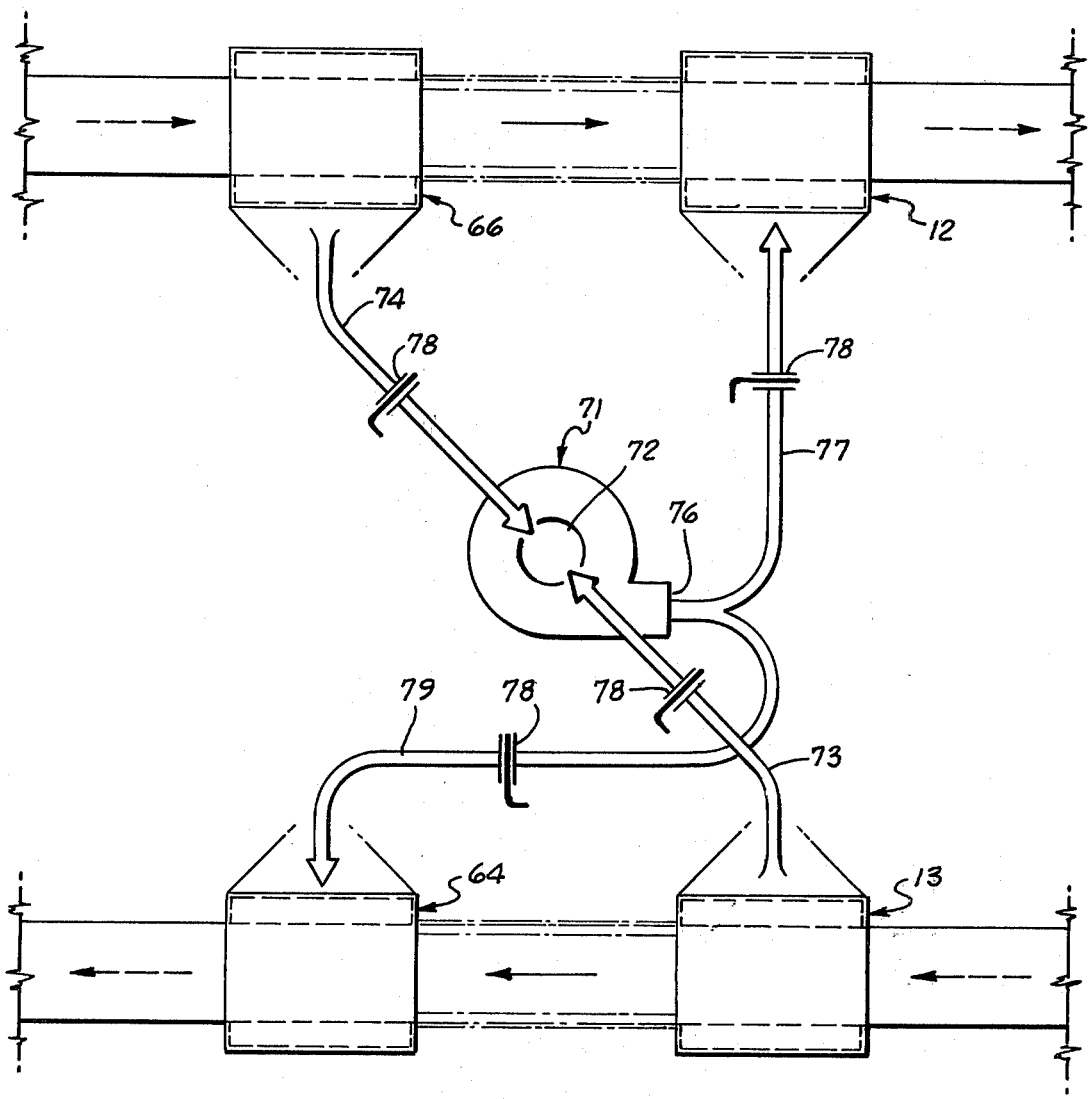
FIG_7

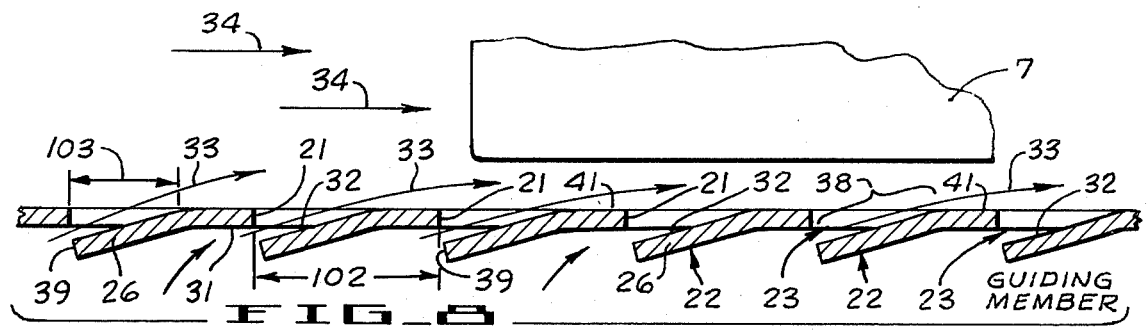
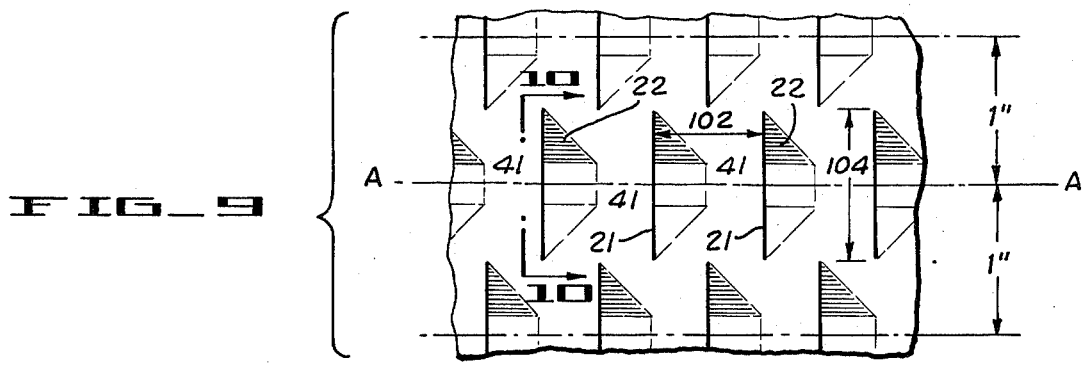
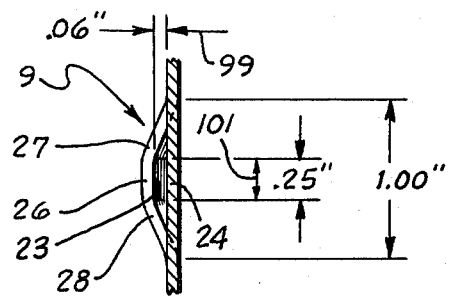
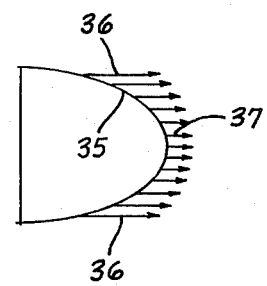
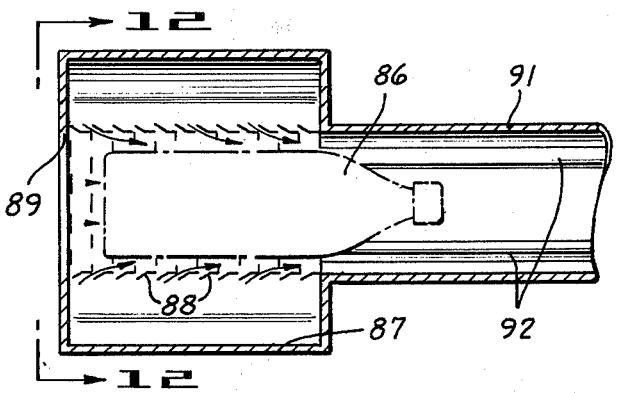
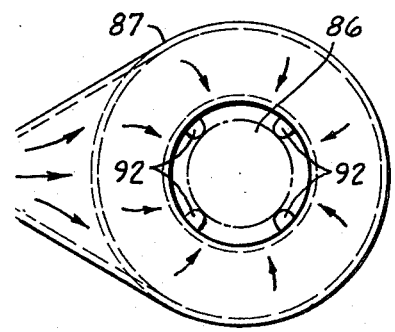
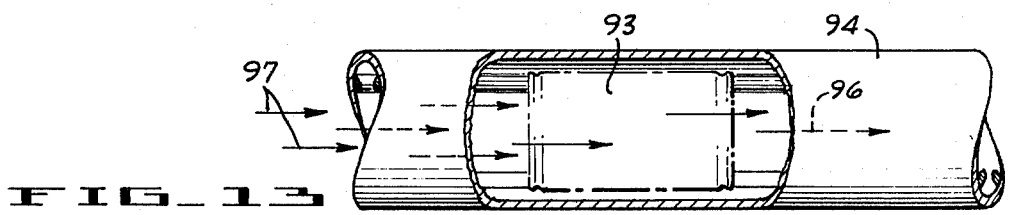

3,980,024

AIR PROPELLED VEHICLE TRANSPORTATION SYSTEM

BACKGROUND OF THE INVENTION

The art of propelling objects through tubes is as old as the primitive blow gun which finds modern usage in the bane of all school classrooms; the pea shooter.

Many attempts have been made to transport freight and people through tubes using a quantity of air acting upon a vehicle. Movement of the vehicle has been no problem in the "pea shooter" systems but their nemesis has been in dealing with the huge quantities of system air rushing from the downstream portal or in diverting the system air around the mid point system stations. The difficulty is that such huge quantities of system air must be separated from passengers exiting the vehicle or even with freight vehicles, the system air must be separated from the workers loading and unloading the vehicle.

Pitts, U.S. Pat. No. 384,333 (1888) was an early attempt to move passengers using a wheeled vehicle which mounted a fan which was driven by the system air and in turn was geared to the wheels of the vehicle. The system air was diverted around the loading and unloading stations; the vehicle acted as a gate valve and passengers loaded through a close fitting opening in the tube which registered with the vehicle doors.

Knox, U.S. Pat. No. 1,813,625 (1931) used diversion valves at the stations.

James, U.S. Pat. No. 3,352,512 (1967) shows novel orange peel valves at the stations.

Ottersen, U.S. Pat. No. 3,711,038 (1973) eliminates the rushing air problem by simply shutting down the entire system when the vehicle reaches the station.

Carstens, U.S. Pat. No. 3,797,405 (1974) diverts the air at each station in the system shown in FIGS. 1 and 7 and uses chimneys adjacent the dead end stations as shown in FIGS. 11 and 12.

Carstens, unlike the present system, is a "booster system"; i.e., the air nozzles inject a small volume of air at high speed at each pumping station which strikes the larger body of slower moving air and boosts its speed.

SUMMARY OF THE INVENTION

The gist of the present invention is the use of areas of Coanda-effect directional slit orifices adjacent the ends of the conduit which substantially completely supply or withdraw the total system air which drives the vehicle. As a result, the vehicle enters and exits to atmosphere thereby making the system uniquely adaptable for passenger use as well as freight transfer. Furthermore, there is nearly a complete absence of transfer of system air through the conduit portals. The separation of the system air used for driving the vehicle from ambient air at the loading and unloading stations makes the transportation system particularly suitable for transportation systems within buildings such as hospitals where airborne germs and bacteria must be closely controlled. The system is also the solution in factories and buildings where industrial standards require close control of airborne dust and other particles.

An object of the present invention is to provide a complete transportation system without expensive air pumps and air interlocks.

Another object is to provide a system which does not include air valves in the cargo conduit nor does it require expensive bypass conduit systems to route the system air around cargo stations.

A further object is to reduce air speeds such as high speed air nozzles in order to reduce noise pollution and heavy or high strength components to withstand the high pressures necessary for high speed air.

Still another object is to provide a system in which the driving system air is only a relatively small pressure increment above atmospheric pressure to eliminate discomfort or even physical damage to animals and humans because of pressure differential between the system conduit and the ambient air stations at atmospheric pressure.

A still further object is to provide a system in which there is an air velocity build up of the total system air from zero to system speed within a short distance.

Another object is to provide a system in which the directional orifices are constructed so that system air can be reversed and the direction of the vehicle reversed without altering the directional orifices.

BRIEF DESCRIPTION OF THE DRAWINGS

FIG. 1 is a schematic of the air propelled vehicle transportation system in which the vehicle can travel from cargo station A, to cargo station B and back again to cargo station A without reversing direction.

FIG. 2 is a schematic of the air propelled vehicle transportation system of the present invention in which the vehicle travels from cargo station C to cargo station D.

FIG. 3 is a cross section of the entrance of the system shown in FIG. 2 taken on an enlarged scale.

FIG. 4 is an end view of the system shown in FIG. 3 taken along line 4—4.

FIG. 5 shows a cross section of three different conduits to illustrate the fact that the conduit is not limited to any particular cross sectional shape. The section is taken along line 5—5 of FIG. 1.

FIG. 6 is a schematic diagram of the system of the present invention illustrating the fact that by using directional dampers the driving air in the cargo conduit can be reversed without altering the directional orifices.

FIG. 7 is a schematic diagram of the system which illustrates a system in which a single fan blower can supply the system air for a loop system as illustrated in FIG. 1.

FIG. 8 is a cross section of the Coanda-effect directional slit orifices shown is a greatly enlarged scale.

FIG. 9 is a plan view of a portion of the conduit containing the directional orifices.

FIG. 10 is a cross section of the conduit containing the directional orifices taken along line 10—10 of FIG. 9.

FIG. 11 is a cross section of the entry portal of another form of the invention of the present system in which the cargo conduit is circular and is adapted for moving objects of circular cross section such as bottles.

FIG. 12 is a side view of the system shown in FIG. 11 taken along line 12—12.

FIG. 13 is a side view of a portion of still another cargo conduit system with a portion of the sidewall removed to show a cylindrical container such as a can.

FIG. 14 is a diagramatic sketch of a theoretical air flow pattern at the entrance to the conduit.

BRIEF DESCRIPTION OF THE PREFERRED EMBODIMENTS

Please refer to FIG. 1 of the drawings.

The air propelled vehicle transportation system of the present invention consists briefly of an elongated conduit 2 of substantially uniform cross section having first and second portals 3 and 4 at the ends 5 and 6 of said conduit; a vehicle 7 dimensioned for travel through said conduit and said portals; a first plurality 8 of Coanda-effect directional slit orifices 9 formed in the walls of said conduit adjacent said first portal for directing driving air from the surface of said conduit in a direction toward said second portal or for receiving air from said conduit; a second plurality 11 of Coanda-effect directional slit orifices 9 formed in said conduit adjacent said second portal for receiving driving air from the surface of said conduit or for directing driving air in. the direction of said first portal; a first manifold 12 communicating with said first plurality of directional orifices; a second manifold 13 communicating with said second plurality of directional orifices; power means 14 communicating with said first and second manifolds for supplying a quantity of air to one of said manifolds and removing air from the other manifold; and said conduit, directional orifices, manifolds, and power means being dimensioned and regulated to drive said vehicle through said conduit and to supply substantially all of the air through one of said manifolds and to remove substantially all of said air from said conduit through said other manifold so that substantially no air is transferred through said portals into or out of said conduit.

The use of Coanda-effect directional slit orifices in combination with an enclosed conduit for moving a vehicle is so new in this field that the results are not completely understood. Applicant has not been able to establish the critical parameters since test results have thus far been established only empirically and each testing model is expensive to build and to test.

The number, size, and placement of Coanda-effect directional slit orifices for obtaining optimum results is not fully known. While it is possible to move vehicles with a few Coanda-effect orifices, for most commercial applications, it is necessary to provide sufficient orifices so that they substantially encircle the inside wall of the conduit to move the vehicle without air transmission through the portals. As shown in FIG. 3, arrow 16 indicates a single row of orifices lying in a plane at the entrance to the conduit. In limited applications, only this single encircling row of orifices would be provided at the first portal and a similar single encircling row of orifices would be placed at the second portal. A separate drawing was not made of this form of the invention because of its apparent limited use and to limit obvious drawing duplication.

FIG. 3 is drawn to show a plurality of rows of Coanda-effect directional slit orifices as indicated by the bracket numbered 17. The bracket indicates a plurality of rows of directional orifices. While there is no particular significance to placing the orifices in "rows", usually for purposes of manufacture, it is convenient to use some system of uniformity. Again, it is not fully known how many "rows" of orifices are required to achieve specific results, but it is obvious that additional "rows" of orifices are required in order to obtain a sufficient volume of air to move vehicles of different weight and at different speeds.

There appears to be one critical limit as to the orifices and that is the fact that the total area of the first plurality of directional orifices must be less than the cross sectional area of the conduit. The velocity through the orifice must be greater than the average velocity of the driving air in the conduit. Thus in order to prevent transfer of air through the portals, the area of the orifices must be less than the area of the conduit.

The Coanda-effect directional slit orifices of the present invention, while not in broad use, are used in open channel conveyors for moving packages and in some cases particulate matter. Since this application presents a novel use and such orifices are not generally know, they are herein described and claimed in combination with particularity.

As shown in FIG. 9 and 10, the Coanda-effect directional slit orifices consist of a transverse slit 21 in the conduit in which a small portion 22 of the conduit is deformed outwardly at an acute angle to form an opening 23 in the wall so that air is directed into the conduit at an angle in a direction toward the opposite end of the conduit. As shown in FIG. 10, the shape of the opening is in the general form of a trapezoid having the longer parallel side 24 of the orifice at the surface of the conduit, and the other parallel side 26 away from the surface of the conduit. The sloping sides 27 and 28 complete the orifice opening. It should be understood that the application is not limited to a trapezoidal shape directional orifice since the opening could be round or square; so long as it caused the throw of the air jet to be substantially in line with the plane of the surface plate.

As shown in FIG. 8, the Coanda-effect directional slit orifices consist of a passage which is roughly defined by the outside surface 31 of the conduit and the inside surface 32 of the side 26 of the orifice. Air flow through the orifices is generally as shown by arrows 33. It should be noted, as indicated by the arrows, that the Coanda-effect directional orifices of the present invention tend to cause the flow of air through the manifold to stay relatively close to the inside surface of the conduit as it enters the conduit. The Coanda-effect was named after Henri Coanda who in 1910 while testing a new flying machine observed the tendency of a fluid to cling to a surface that is near an orifice from which the fluid emerges. Note that curvature of arrows 33 which indicate the air emerging from the orifices follows a curve instead of a straight path, Coanda explained this curved path as not simply the result of surface tension but the fact that the passage of air over the curved surfaces created a vacuum at the surface. After some distance, the air flow builds up to a general flow as shown by the straight arrows 34. It is believed that the air flow pattern at the entrance to the conduit is somewhat as shown in FIG. 14 in which the parabolic line 35 represents the beginning of measurable air flow and the arrows indicate the direction and speed of air flow. The longer vector arrows 36 indicate that the speed at the orifices is greater than the speed of the air at the center of the conduit at least near the portals. The arrows 37 at the center of the conduit are shorter indicating a slower velocity. Note, the velocity pattern in the vicinity of the directional orifices is the reverse of the velocity pattern in the mid section of the conduit where the flow pattern follows the normal pattern in which the air speed is slower at the sides of the conduit due to surface friction.

Each of the directional orifices includes a guiding member which in FIG. 8 is indicated by the bracket 38 which extends outwardly from the wall of the conduit to an abrupt end 39 thereby providing an unobstructed inner wall surface which is composed of smooth surface areas 41 between the slitted areas. As shown, the guiding members do not overlap the transverse slits in the conduit. It is to be noted that overlapping guiding members might be used and the application is not limited to non-overlapping guiding members. It is impractical, however, to economically construct overlapping guiding members.

The system of the present invention has been found to be amazingly adaptable to numerous configurations and with various arrangements of air supply and air withdrawal means. As shown in FIG. 2, the power means consists of a first fan 46 for supplying air under pressure to the first manifold 47. The power means also includes a second fan 48 connected to a second manifold 49 for withdrawing air under negative pressure. The conduit 51 may be straight or curved as required. Directional orifices 52 and 53 are provided as previously described and the vehicle 7 enters the first portal 54 and exits the second portal 55.

One of the features of the present invention is the fact that the direction of vehicle 7 may be reversed by merely reversing the fans and the flow of air. There is no need to alter the directional orifices in any way. This ability to reverse is obviously an advantage over systems which inject air by high speed nozzles to induce the flow of secondary air as the air cannot be reversed in such systems.

Where it is desired to use a closed cargo loop system as illustrated in FIG. 1, a second system, identical to the first system described may be used. The elements of the system shown include: a second elongated conduit 58 of substantially the same uniform cross section as said first conduit and having a third portal 59 at one end which is spaced from said second portal and having a fourth portal 61 at the other end of said second conduit which is spaced from said first portal of said first conduit; a third plurality of Coanda-effect of directional slit orifices 62 formed in said second conduit adjacent said third portal for directing driving air from the surface of said conduit in a direction toward said fourth portal or for receiving air from said second conduit; a fourth plurality of Coanda-effect directional slit orifices 63 formed in said second conduit adjacent said fourth portal for directing driving air from the surface of said conduit in a direction from said second conduit or in a direction toward said third portal; a third manifold 64 communicating with said third plurality or directional orifices; a fourth manifold 66 communicating with said fourth plurality of directional orifices; a power means consisting of a fan 67 communicating with said third and fourth manifolds for supplying a quantity of air to one of said manifolds in said second conduit and withdrawing air from the other manifold in said second conduit. As previously described, the power means includes a fan 68 which connects the first and second manifolds and supplies or withdraws air thereto.

In operation, system air moves from fan 68 by conduit indicated by arrow 69 to manifold 12, through the plurality or orifices 8, through conduit 2, through plurality of orifices 11, through ducts indicated by arrow 70, to fan 67 via ducts indicated by arrow 79, through ducts indicated by arrow 75, to manifold 64 through plurality of orifices 62, through conduit 58, through plurality of orifices 63, through manifold 66, through ducts indicated by arrow 79 and back to fan 68.

It may be seen that it is not necessary to have a closed system for the air thus the driving air may be inducted by fan 68 from the ambient atmospheric air and withdrawn by a separate fan (not shown) from manifold 13 and exhausted to atmosphere. In like manner, fan 67 can take air from ambient air at atmospheric pressure and a fan (not shown) can withdraw air from manifold 66 and exhaust the air to atmosphere.

As in previously described conduit, substantially all of the air is supplied through one of the manifolds and substantially all of the air is removed through the other manifold so that substantially no air is transferred through the third and fourth portals into or out of the second conduit. Thus, the vehicle 7 may be loaded or unloaded at stations A and B at atmospheric pressure and the stations are free of any substantial air movement from the adjoining portals. Since there is no air velocity between adjoining portals, the distance between the adjoining portals may be spaced as far apart as needed.

FIG. 7 shows an alternate power means for the system of FIG. 1 in which a single fan could power the entire system. The inlet 72 of the fan is connected to the second manifold 13 by air duct 73 and to manifold 66 by air duct 74. The outlet 76 of the fan is connected to first manifold 12 by air duct 77 and to third manifold 64 by air duct 79. In order to properly "tune" the system to compensate for different conduit lengths and duct lengths, gate valves 78 may be placed in the air ducts. The single fan in FIG. 7 is indicated by the number 71. As FIG. 5 indicates, the conduit may be square as indicated by the number 81, rectangular as indicated by the number 82, or circular as shown by the number 83.

FIGS. 11 and 12 illustrate one possible use of a circular conduit using the apparatus of the present invention. As shown, the vehicle is a cylindrical bottle such as a plastic bottle 86. The entire system is similar to that previously described and the manifold 87, plurality of directional orifices 88, entrance portal 89 and coveyor conduit 91 are shown for illustration. The discharge end with its discharge portal and manifold are the same with the directional orifices reversed in direction. As a practical matter it is advisable to place skids 92 in the circular conduit and across the directional orifices to prevent scratching of plastic bottles and to provide for more friction-free support in the conveyor.

FIG. 13 illustrates still another application of a circular conduit conveyor system in which the article is a cylindrical container such as an empty or filled can 93. The can moves in conduit 94 in the direction of arrow 96; propelled by air as indicated by arrows 97. It is also possible with the present system to move cans with their axis transverse to the longitudinal axis of the conduit in a round or square conduit. Further, the cans can also be moved in an upright position in a square conduit.

Extensive testing was carried out on 20 foot conduits; extended to 40 feet and finally to 100 feet. The results of one series of trial runs are set forth below as illustrative of the invention.

TEST NO. 1

The conduit and the portal openings measured 14 in. × 14 in. with the sections carrying the plurality of directional orifices measuring 24 in. in length. Directional orifices were placed on all four sides of the conduit adjacent the portals as shown in the drawings. A manifold extending out an additional 4 in. on all four sides and a length of 2 ft. surrounded the directional orifices. The directional orifices are the classic 0.060 in. depth as indicated by arrows 99 having a width of 0.25 in. as indicated by arrows 101, axial spacing of slots of ¾ in. as indicated by arrows 102, axial orifice length of ⅜ in as indicated by arrows 103, and a transverse slit length of 1 in. as indicated by arrows 104. Identical manifolds and directional orifices were placed at opposite ends of a 100 ft. long conduit. A 5 horsepower fan was connected to the first manifold and a 5 horsepower fan to the second manifold. Each end of the conduit has 1560 directional orifices. Tests were made with a carrier which weighed 17 lbs. empty. The carrier rear panel had an area of about 144 sq. in.. The tests were made with a load in which the total weight of the vehicle and load was 50 lbs.. The manifolds of both fans were variably restricted with a throttling valve for purposes of testing.

Run No. 1

| Velocity of air in the conduit | 2364 ft./min. |
| Velocity of vehicle | 460 ft./min. |

Run No. 2

| Velocity of air in the conduit | 3800 ft./min. |
| Velocity of vehicle | * |

Run No. 3

| Velocity of air in conduit | 2194 ft./min. |
| Velocity of vehicle | 400 ft./min. |

Run No. 4

| Velocity of air in conduit | 1790 ft./min. |
| Velocity of vehicle | 300 ft./min. |

*Vehicle crashed through the side of building due to high velocity, no reading taken.

Tests on slot velocity indicate that for the classic 0.060 in. depth orifice, the velocity of the air through the orifice is 3 to 3.5 times the resulting velocity of air in the conduit. When the depth of orifice was increased to 0.090 in., the velocity of air through the orifice was reduced to 2 to 2.5 times the resulting velocity in the conduit.

Tests showed that the test model air speeds of 5000 ft/min. were easily attainable but vehicles were not tested as the test facilities have insufficient braking means for stopping the vehicle. With a different model, air speeds and vehicle speeds much greater appear attainable.

Manometers placed in the conduit indicate that the gauge pressure was only about 0.8 in. of water, or about 1/30 in. p.s.i.. Such pressures are far below pressures which are quite comfortable to human beings, and animals.

TEST NO. 2

Tests were run with a conduit with a circular cross section 5 in. in diameter. This system used the classic slot depth of 0.060 in.. Ninety directional orifices produced a manometer reading of 5 in. water and an air velocity of 3000 ft./min. in the tube. Bottle speeds with the bottles empty were about 80 per cent of the conduit air speed. The bottle weighed 2 ½ oz. and was about 11 in. long with a diameter of 3¼ in.

FIG. 6 illustrates a system in which a single fan 106 can be used to drive a vehicle in opposite directions. Note that no modification of the directional orifices 107 or 108 is required. Directional dampers are placed in ducts 111 and 112 to switch the flow of driving air. In operation the system works as follows. If the vehicle is to travel in the direction shown by arrow 113, driving air flows from the discharge end 114 of fan 106 through duct 115, through damper valve 110, through duct 112 to manifold 116, through orifices 108, through conduit 117, through orifices 107, through manifold 118, through duct 111, through damper 109, through duct 119, and back to inlet 120 of fan 106.

To reverse the direction of the vehicle so that it will travel in the direction shown by arrow 121 it is merely necessary to switch the dampers and the direction of air flow as follows: Air flows from discharge end 114 through duct 115 where it follows duct 122 to damper 109, to duct 11, to manifold 118, through orifices 107, through duct 117, through orifices 108, through manifold 116, through duct 112, through damper 110, through duct 123, through duct 124, and back to inlet 120 of fan 106.

I claim:

1. An air propelled reversible vehicle transportation system comprising:
    a. an elongated vehicle conduit having a substantial length devoid of openings of substantially uniform cross section for containing moving air at low gauge pressure having unrestricted first and second non-gated portals open at all times to atmospheric pressure at the ends of said conduit;
    b. a vehicle dimensioned for travel through said conduit and said portals; and having a cross sectional area slightly less than the area of said conduit portals;
    c. a first plurality of axially aligned closely spaced Coanda-effect directional slit orifices having an opening which is substantially greater in width than depth formed in the walls of said conduit and located adjacent said first portal so that the air flow is initially along the surface of said conduit and provides driving air in a direction toward said portal or for receiving reverse air from said conduit along the surface of said conduit;
    d. a second plurality of Coanda-effect directional slit orifices having an opening which is substantially greater in width than depth formed in the walls of said conduit located adjacent said second portal for receiving said driving air along the surface of said conduit or for directing said reverse driving air in the direction of said first portal;
    e. a first manifold communicating with said first plurality of directional orifices;
    f. a second manifold communicating with said second plurality of directional orifices;
    g. powered fan or blower means communicating with said first and second manifolds for supplying a quantity of air to one of said manifolds and removing air from the other manifold; so that the pressure in said conduit is slightly above the pressure outside said portals;
    h. said conduit, Coanda-effect directional slit orifices, manifolds, and power means being dimensioned and regulated to drive said vehicle through said conduit and to supply substantially all of the air through one of said manifolds and to remove substantially all of said air from said conduit through said other manifold so that substantially no air is transferred through said portals into or out of said conduit with a minimal amount of air entering at said first port when no vehicle is traveling through said conduit and a minimal amount of air flows out of said first port when said vehicle is in transit through said conduit;

i. there being a substantial number of orifices in each of said first and second pluralities of orifices forming a row; and j. there being a plurality of closely spaced rows of orifices and said rows are spaced along the longitudinal axis of said conduit for only a minor portion of the total length of said conduit.

2. A system as described in claim 1 comprising:
a. said first and second plurality of Coanda-effect directional slit orifices are around the greater part of the inside wall of said conduit in close spaced side-by-side relation.

3. A system as described in claim 1 comprising:
a. the total areas of said first plurality of directional orifices and the total area of said second plurality of directional orifices are each less than the cross sectional area of said conduit.

4. A system as described in claim 1 comprising:
a. each of said directional orifices consists of a transverse slit in said conduit and a small wall portion of said conduit deformed outwardly at an acute angle to form an opening in said wall so that air is directed into said conduit at an angle in a direction toward the opposite end of said conduit but due to the Coanda-effect the initial flow of air is along the surface.

5. A system as described in claim 4 comprising:
a. each of said directional orifices consists of guiding members which extend outwardly from the walls of said conduit thereby providing an unobstructed inner wall surface; and
b. said guiding members do not overlap said transverse slits in a said conduit.

6. A system as described in claim 1 comprising:
a. each of said directional orifices consists of a passage formed in said conduit at an acute angle having a slope no greater than about 15° to the axis of said conduit.

7. A system as described in claim 1 comprising:
a. said power means communicating with said first manifold is a first fan for supplying air under pressure to said first manifold; and
b. said power means communicating with said second manifold is a second fan for withdrawing air under negative pressure from said second manifold.

8. A system as described in claim 1 comprising:
a. a second elongated vehicle conduit of substantially the same uniform cross section as said first conduit for containing moving air at low gauge pressure and having a third portal at one end open to atmospheric pressure which is spaced from said second portal and having a fourth portal at the other end of said second conduit open to atmospheric pressure which is spaced from said first portal of said first conduit;

b. a third plurality of Coanda-effect directional slit orifices having an opening which is substantially greater in width than depth formed in said second conduit adjacent said third portal for directing driving air from the surface of said conduit in a direction toward said fourth portal or for receiving air from said second conduit;

c. a fourth plurality of Coanda-effect directional orifices having an opening which is substantially greater in width than depth formed in said second conduit adjacent said fourth portal for directing driving air from the surface of said conduit in a direction from said second conduit or in a direction toward said third portal;

d. a third manifold communicating with said third plurality of directional orifices;

e. a fourth manifold communicating with said fourth plurality of directional orifices;

f. power means communicating with said third and fourth manifolds for supplying a quantity of air to one of said manifolds in said second conduit and withdrawing air from the other manifold in said second conduit; and g. said second conduit, directional orifices, manifolds, and power means connected therewith being dimensioned and regulated to drive said vehicle through said second conduit and to supply substantially all of the air through one of said manifolds in said second conduit and to remove substantially all of the air from said second conduit through said other manifold so that substantially no air is discharged through said third and fourth portals into or out of said second conduit.

9. A system as described in claim 8 comprising:
a. said power means consists of a single air fan having an inlet communicating with said second and fourth manifolds for withdrawing air from said manifolds and a discharge end communicating with said first and third manifolds for supplying air to said manifolds.

10. A system as described in claim 8 comprising:
a. said power means consists of a first fan having an inlet communicating with said fourth manifold and a discharge outlet communicating with said first manifold; and
b. said power means consists of a second fan having an inlet communicating with said second manifold and a discharge outlet communicating with said third manifold.

11. A system as described in claim 1 comprising:
a. said conduit is formed with a circular cross section; and
b. said vehicle is a container.

12. A system as described in claim 11 comprising:
a. said conduit includes skid rails holding said container a selected distance from the walls of said conduit.

13. A system as described in claim 1 comprising:
a. said vehicle includes wheels for supporting the weight of said vehicle; and
b. said wheels are mounted for engaging contact with the side walls of said conduit and for spacing the main body of said vehicle from the sidewalls of said conduit.

* * * * *

UNITED STATES PATENT AND TRADEMARK OFFICE
CERTIFICATE OF CORRECTION

PATENT NO. : 3,980,024

DATED : September 14, 1976

INVENTOR(S) : RUDOLPH E. FUTER

It is certified that error appears in the above-identified patent and that said Letters Patent are hereby corrected as shown below:

Column 2, line 51, change "is" to --- in ---

Column 5, line 41, delete the second [of]

Column 8, line 45, after toward said insert --- second ---

Signed and Sealed this

Ninth Day of November 1976

[SEAL]

Attest:

RUTH C. MASON
*Attesting Officer*

C. MARSHALL DANN
*Commissioner of Patents and Trademarks*